Figure 1:
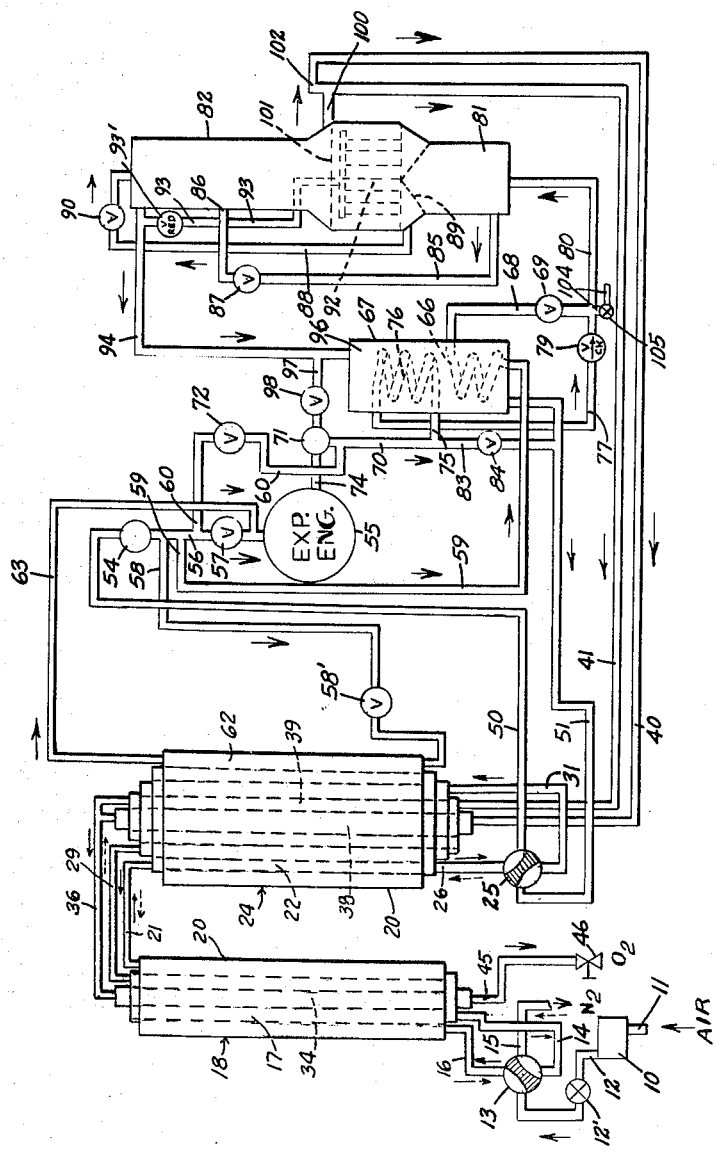

Jan. 5, 1960  R. W. HUGHES ET AL  2,919,555
APPARATUS FOR AND METHOD OF SEPARATING GASES
Filed July 28, 1955  2 Sheets-Sheet 1

INVENTORS:
ROBERT W. HUGHES
SAMUEL C. COLLINS
BY
*Terrell L. Ruehlman*
ATTORNEY

INVENTORS:
ROBERT W. HUGHES
SAMUEL C. COLLINS
BY
*Terrell S. Ruhlman*
ATTORNEY

United States Patent Office 2,919,555
Patented Jan. 5, 1960

2,919,555

APPARATUS FOR AND METHOD OF SEPARATING GASES

Robert W. Hughes, Michigan City, Ind., and Samuel C. Collins, Watertown, Mass., assignors to Joy Manufacturing Company, Pittsburgh, Pa., a corporation of Pennsylvania Application July 28, 1955, Serial No. 524,864

9 Claims. (Cl. 62—13)

This invention relates to apparatus for and a method of separating gases and more particularly to an apparatus for and a method of separating oxygen from the remaining constituents of air. The invention deals primarily with an improved starting method and means and an improved warm-up method and means for an oxygen generating plant.

In order to take advantage of the different boiling points of nitrogen and oxygen the separation of oxygen from air is generally accomplished by reducing the air to liquid form and distilling it in a rectification column. As the temperatures at which rectification is effected are far below those at which the condensation of water and carbon dioxide take place, it has been found necessary in order to avoid plugging certain parts of the apparatus to remove these impurities before the air is rectified, with a reversing heat exchanger unit of the general type having a plurality of passages, through one of which an entering stream of air is passed in countercurrent heat exchange relation with outgoing oxygen product and nitrogen effluent streams flowing through other of said passages and at a lower temperature to reduce the temperature of the air and remove the water vapor and carbon dioxide impurities therefrom, with the flow of the entering air and nitrogen effluent streams being periodically reversed to effect a re-evaporation and removal of the impurities on the next ensuing passage of the nitrogen effluent stream through the passage just previously occupied by the air stream, receiving favorable use.

At least the major portion of the raw compressed air, after it has been purified by its passage through the aforementioned reversing heat exchanger, is passed through an expansion device wherein its pressure and temperature are greatly reduced by the performance of external work. The cold compressed air from the expansion device, commonly an expansion engine, is passed through a liquefier in heat exchange relation with the outgoing nitrogen effluent, which is at a lower temperature than the air, to further cool the air before it is directed into a rectification apparatus. In starting up a plant of this type, it has been found that the compressed air must initially be cooled down to that temperature wherein all the water vapor has been removed before it can be passed through the liquefication apparatus, as the depositing of ice in this unit would plug it to such a degree that there would be a substantial pressure drop thereacross and the plant would be rendered inoperative. It is therefore an object of the present invention to provide an improved apparatus for and method of starting an oxygen generating plant by providing a system wherein substantially all of the moisture is removed from the air prior to its passage through the liquefication apparatus, to thus obviate the deposition of ice in the latter unit and the resulting plugging thereof.

Following the initial cooling period wherein the incoming compressed air is freed of water vapor, it is necessary to continue to cool the air toward a point wherein all the carbon dioxide is deposited out in the reversing heat exchanger and at the same time build up a supply of liquid air in the boiler-condenser of the rectification column before starting the normal rectification period. It is therefore a further object of the present invention to provide an improved starting method and means wherein all of the impurities of higher boiling point are effectively removed and a predetermined amount of the purified air is liquefied prior to the beginning of the normal operation of the plant.

During the normal operation of an oxygen generating plant of this general type, particularly during long periods of operation, there may occur, due for example to some breakdown in the reversing heat exchanger unit or other part of the apparatus, a deposition of impurities, particularly carbon dioxide, in certain parts of the apparatus, such as the passages in the liquefier, to cause them to become plugged and to develop such a large pressure drop thereacross as to render the system inoperative. When this occurs, it is necessary to thaw these pieces of apparatus, so to speak, to cause the impurities to become re-evaporated and removed from the system. It is therefore another object of the present invention to provide an improved apparatus for and method of quickly and efficiently warming at least portions of the apparatus of an oxygen generating system to effect the removal of deposited impurities, and do this with the loss of a minimum amount of operating time, and efficiency.

In a preferred embodiment of the present invention, wherein compressed air and nitrogen effluent are passed alternately through the same courses in a reversing heat exchanger in counterflow heat exchange relation with each other to remove from the raw air and deposit on the walls of the heat exchanger courses substantially all of the water vapor and carbon dioxide impurities during the passage of the raw air therethrough, and to re-evaporate and remove said impurities from the heat exchanger course, on the next ensuing passage of the nitrogen effluent therethrough, and wherein the air stream is split subsequent to its passage through the reversing heat exchanger, with the major portion thereof passing first through an expansion engine, where it is expanded and cooled with the performance of external work, thence going through a liquefier, where it is in heat exchange relation with the colder nitrogen effluent which is enroute to the reversing heat exchanger, and thence passing into a rectification column, and with the minor, split-off portion of the air being passed through the liquefier in heat exchange relation with the colder nitrogen effluent, wherein it is liquefied and thereafter united with the major portion of the purified air stream before the latter is passed into the rectification column, there is provided an improved starting means and method which comprises and utilizes means for conducting the major portion of the air stream, after it has been cooled by its passage through the expansion engine, into the path normally occupied by the outgoing nitrogen effluent, downstream from the point at which the latter leaves the liquefier, with the result that the cold expanded air flows out through the reversing heat exchanger in heat exchange relation with the incoming air stream to cool the latter. After the initial starting period wherein the temperature of the incoming air has been lowered to such a degree that substantially all of the water vapor is removed therefrom, the cool expanded air from the expansion engine is directed into the conduit normally occupied by the nitrogen rich waste gases, prior to the latter's passing into the liquefier, with the result that the major portion of the air stream is passed through the liquefier in heat exchange relation with a course therein through which a portion of the air stream normally flows but in which is trapped during the portion of the starting period now being described a small body of air. This procedure is followed until the temperature of the air stream is reduced to a point where substantially all of the carbon dioxide is removed in the reversing heat exchanger unit. At this point the aforementioned minor stream of air is permitted to flow through its liquefier course in heat exchange relation with the main stream of air and wherein it is liquefied and then passed into a rectification column. The system is operated in this manner until a predetermined amount of liquid air is built up in the rectification column, at which time the system is ready for normal operation and the main portion of the air stream is passed through its aforementioned normally used path in the liquefier and into the rectification column.

In one embodiment of the invention illustrated and described herein, the improved means and method for warming up the oxygen generating plant and particularly the liquefier to remove any impurities which may have become deposited therein, include and use a means for diverting the flow of the main portion of compressed air to bypass the expansion engine and a means for conducting this major air stream into the conduit normally occupied by the outgoing nitrogen-rich waste gases, upstream of the point at which said conduit enters the liquefier, with the result that the air stream now flows over the courses normally traversed by the cold air stream. As the entering air stream is no longer cooled by the products of rectification in the reversing heat exchanger and by passage through the expansion engine, it is warmed gradually, with the result that the warmed air stream flowing through the liquefier thaws out the air courses therein, so to speak, to cause the re-evaporation of any impurities which had been deposited therein. The re-evaporated impurities can be purged from the system by opening the air courses to the atmosphere for a brief period. After the removal of these impurities the plant is again ready for normal operation.

In another embodiment of the invention, and particularly with respect to the warm-up feature, there is provided an external heating source through which the compressed air, subsequent to its passage through the expansion engine bypass, is directed, with the result that the air stream is heated to a higher temperature before its passage through the liquefier, to thus more quickly re-evaporate the impurities deposited in the latter and reduce the amount of time required for the warm-up period.

Figure 2:
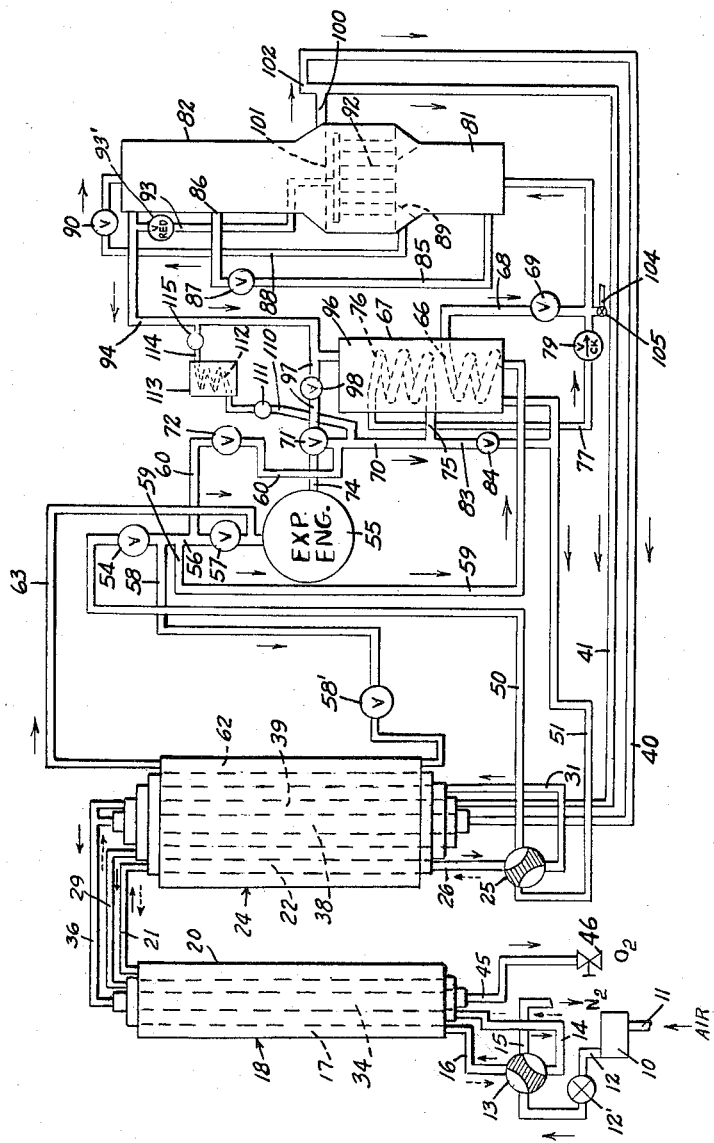

In addition to the above mentioned objects of the invention other objects and advantages will be apparent from the following more detailed description of the invention when read in conjunction with the attached drawings in which:

Fig. 1 is a schematic diagram of an oxygen generating system made according to the present invention; and Fig. 2 is a similar schematic diagram showing a modified form of the oxygen generating system of Fig. 1.

Referring now specifically to Fig. 1 of the drawings there is shown at 10 an air compressor having an intake conduit 11 and a discharge conduit 12. The compressor may be driven in any suitable manner at constant speed. Conduit 12 connects with a reversing valve 13, with a stop valve 12' being placed in the conduit if desired. Also connected to the reversing valve 13 are a plurality of conduits 14, 15 and 16, the last of which is connected to a course 17 in one (the one first entered by the inflowing air) unit 18 of a reversing heat exchanger 20. It will be understood that heat exchanger 20 could be constructed as a single unit, however, many times, and as illustrated herein, it is desirable to construct it in two sections to minimize the overall height of the apparatus of which it forms a part. A conduit 21 connects the upper ends of course 17 and a course 22 in a second unit 24 of the reversing heat exchanger. The lower end of course 22 is connected with a second reversing valve 25 by means of conduit 16. Conduit 14 which connects with the reversing valve 13 also connects with the lower end of a second course 28 in the heat exchanger unit 18, while a conduit 29 connects the upper ends of course 28 and a course 30 in the heat exchanger unit 24. The lower end of course 30 is also connected with the reversing valve 25, in this instance by means of a conduit 31.

The other conduit, namely conduit 15 which is connected to the reversing valve 13 is open to the atmosphere for discharging waste gases therefrom as will be explained more in detail below. A further course 34 extends throughout the length of the heat exchanger unit 18 and is connected at its upper end to a conduit 36 which also connects the upper end of a further course 38 in the second exchanger unit 24. The lower end of course 38 is connected with a conduit 40 through which oxygen product flows as will also be explained in more detail below. A further course 39 through which oxygen also flows is provided in heat exchanger 24. Course 39 connects at its lower end with a conduit 41 and at its upper end with conduit 36. The lower end of course 34, on the other hand, is connected to a conduit 45 through which oxygen product also flows. Conduit 45 may be provided with a suitable stop valve 46 is desired. There is also connected with the reversing valve 25 a further pair of conduits 50 and 51 through which normally pass respectively the purified air and outgoing nitrogen effluent.

The mode of operation of the reversing heat exchanger 20 will be readily understood by those skilled in the art, and it will suffice to say here that during the normal operation of the plant, the reversing valves 13 and 25 are automatically periodically reversed in a conventional manner, not shown, with the result that the incoming compressed air stream flowing through conduit 12 passes either through conduit 16 or conduit 14 into the respective courses 17 and 22 or 28 and 30 of the reversing heat exchanger units 18 and 22, thence through either conduit 26 or 31 to the reversing valve 25 and out through the conduit 50. Nitrogen effluent, on the other hand, which is conducted from the separating apparatus through conduit 51, as will be explained hereinafter, flows out from reversing valve 25 through either of the conduits 26 or 31 through which the air stream has just previously passed, thence through the respective conduits 22, and 17 or 30 and 28, through conduit 16 or conduit 14, reversing valve 13 and out to the atmosphere through conduit 15. The product oxygen stream which may consist of oxygen in either a gaseous or liquid state or both, as will be understood as the description unfolds further, passes through courses 38, 39 and 34, of the respective heat exchanger units 24 and 18 and out through conduit 45. As the nitrogen effluent and oxygen product are at a substantially lower temperature than the freezing points of water vapor and carbon dioxide, these impurities will be deposited out of the air stream in the reversing heat exchanger courses as the temperature of the incoming air is lowered through heat exchange with the outgoing oxygen product and nitrogen effluent. The nitrogen effluent on its next ensuing passage through the reversing heat exchanger courses will re-evaporate the deposited ice and carbon dioxide and remove the same from the heat exchanger to the atmosphere.

It may be desirable to add refrigeration in the heat exchanger unit to insure that the temperature in the lower end of heat exchanger unit 24 is reduced to such a degree that all of the carbon dioxide is deposited from the incoming compressed air stream. Various systems have been devised for effecting this additional refrigeration, as for example by recirculating cooled oxygen product through separate courses in the heat exchanger unit 24 or by reducing the volume of air flow through the reversing heat exchangers, as disclosed in the copending application of Dr. Samuel C. Collins, Ser. No. 493,332, now Patent No. 2,808,823, which is assigned to the assignee of this invention. In the present oxygen generating plant there is illustrated and described below a means for recirculating a part of the purified compressed air stream through a separate course in the heat exchanger unit 24 to add refrigeration to the latter unit. Conduit 50, which conducts the purified compressed air stream from the heat exchanger 20, connects with an intake surge chamber 54 which in turn connects with an expansion engine 55 through a conduit 56 in which a suitable stop valve 57 is placed. A plurality of conduits 58, 59 and 60 branch from conduit 56 upstream of valve 57, with the conduit 58 connecting through a suitable stop valve 58' with the lower end 62 of a separate course in the heat exchanger unit 24 for the purpose of conducting a portion of the cold purified air through said unit, as aforementioned. The upper end of course 62 is in turn connected to the conduit 56, however downstream from stop valve 57, by means of a conduit 63.

Conduit 59 connects at its free end with a course 66 in a further heat exchanger or liquefier 67. The other end of course 66 connects with a conduit 68, a suitable stop valve 69 being placed in the latter conduit. Conduit 60, which is the third of the conduits connected to conduit 56 upstream from the stop valve 57, connects with a conduit 70 the far end of which in turn connects with a discharge surge tank 71 associated with the expansion engine 55. A suitable stop valve 72 is placed in conduit 60. A conduit 74 connects the discharge surge tank 71 with the expansion engine 55, while conduit 70 connects through a conduit 75 with a second course 76 in the liquefier 67. Course 76 at its other end connects with a conduit 77, with which the conduit 68 leading from the other course 66 in the liquefier connects. A suitable check valve 79 is positioned in the conduit 77 ahead of the point of jointer of the latter with conduit 68, and a single conduit 80 connects conduits 68 and 77 with the bottom or high pressure stage 81 of a rectification column 82. Also connected with the conduits 68 and 77 at their juncture with conduit 80 is a further conduit 104. A stop valve 105 which is placed in the conduit 104 is normally closed except during a portion of the warm-up period as will be explained hereinafter.

A further conduit 83 having a stop valve 84 positioned therein connects conduit 70 at the junction of the latter with conduit 75 to the conduit 51, through which, as aforementioned, the nitrogen effluent from the rectification column flows. A conduit 85, through which oxygen enriched liquid air flows, connects the high pressure stage 81 of the rectification column with a point 86 in the upper part or low pressure stage of the column. Conduit 85 is provided with a suitable valve 87 to throttle the flow of liquid therethrough to reduce its pressure to substantially that of the lower pressure in the upper part of the rectification column. A conduit 88 connects with the high pressure portion of the rectification column above the nitrogen shelf 89 and conducts nitrogen-rich liquid to the top of the column. Conduit 88 is also provided with a suitable valve 90 to reduce the pressure of the liquid flowing therethrough to substantially that of the pressure in the upper end of the column. Valves 87 and 90 may be of the type shown in the Samuel C. Collins Patent No. 2,737,022.

The rectification column 82 is also provided with a conventional boiler-condenser 92, with a further conduit 93 having a pressure reducing valve 93' connecting a point above the boiler-condenser with a conduit 94 through which nitrogen effluent flows from the column, to carry away the rare gases. Conduit 94 at its other end connects with an outer course 96 in the liquefier 67, this course connecting with conduit 51, above mentioned, at the lower end of the liquefier. A conduit 97, provided with a stop valve 98, connects the conduit 94 with the discharge surge chamber 71.

A conduit 100, the lower limit of which is positioned adjacent the liquid level 101 in the boiler-condenser (desirably its mouth is in part above and in part below the liquid level), connects with the rectification column to conduct oxygen therefrom. Conduit 100 connects with the aforementioned conduits 40 and 41 and is provided with an upstanding portion 102 which extends between conduits 100 and 40. Any slugs of liquid oxygen which are splashed, due to the rather vigorous boiling in the boiler-condenser, out through conduit 100 will flow downwardly through conduit 41, whereas the gaseous oxygen product will rise in conduit 102 and pass out through conduit 40. As will be readily understood, conduit 100 can in effect be relocated vertically in either direction to either conduct a substantially completely gaseous or liquid oxygen product from the rectification column.

During the normal operation of the oxygen generating plant described above and illustrated in Fig. 1, the purified air stream flows through conduit 50 and into the intake surge tank 54, with one, substantially smaller, portion of the air stream being split off and flowing through conduit 58 for recirculation through the separate course 62 in the heat exchanger unit 24, and a second smaller stream of air being split off and directed through conduit 59 and into the liquefier course 66. The rate of flow of this latter stream is readily controllable by the valve 69 in conduit 68 through which the air flows after leaving liquefier course 66. During normal operation, valve 57 is open and valve 72 is closed, with the result that the major portion of the air stream passes through conduit 56 into the expansion engine 55. Valves 84 and 98 are also closed during normal operation with the result that the cold expanded air from the expansion engine passes through the discharge surge tank 71, conduits 70 and 75, liquefier course 76, conduit 77, check valve 79, and finally is united with the minor portion of the air stream flowing from conduit 68. The united air stream then flows through the single conduit 80 into the high pressure stage 81 of the rectification column.

As aforementioned, oxygen product is delivered from the rectification column through the conduit 100 and into the reversing heat exchanger through conduits 40 and 41, while the nitrogen effluent passes out from the column through conduit 94 and into course 96 of the liquefier 67, wherein it is in heat exchange relation with the air courses 76 and 66, and finally out through conduit 51 to the reversing valve 25 of the reversing heat exchangers.

Referring now specifically to the improved means and method for starting the present oxygen generating plant, it will be appreciated that since the compressed air which flows from the compresser 10 and into the heat exchanger unit 18 is taken from the ambient air and is at a temperature of on the order of 298° K., it is saturated with water vapor. It has been found that if during the initial starting period the air stream is circulated through the plant and the normal path of flow is as outlined above, as the temperature of the air is gradually reduced and the water vapor and carbon dioxide begins to freeze out, these deposited impurities cause a plugging of the apparatus and particularly the courses in the liquefier. During the initial starting period, it is therefore desirable to recirculate the air back to the atmosphere without its having passed through the liquefier courses. To effect this, valve 84 is opened and valve 98 is closed, with the result that the cool expanded air from the expansion engine will flow through conduits 70 and 83 and into the conduit 51 which, as aforementioned, normally carries nitrogen effluent en route to the reversing heat exchanger. It can be seen therefore that the air which is cooled in the expansion engine is recirculated through the reversing heat exchanger in heat exchange relation with the entering air stream to gradually reduce the temperature of the latter until substantially all of the water vapor is removed therefrom. During this period liquid control valve 69 can be closed, with the air stream in its entirety under these conditions thus passing through the expansion engine and, as mentioned, valve 98 being closed, the cold expanded air from the expansion engine can not pass through conduit 97. Valves 87 and 90 are constructed in such a manner that although they will readily allow the passage of liquid therethrough, they resist the passage of gases, with the result that the expanded air stream will likewise not flow through conduit 75 and course 76 in the liquefier but will, as aforementioned, follow the path of least resistance and flow through conduit 83 and the opened valve 84 therein.

The courses in the reversing heat exchanger 20 are of sufficient size to accommodate the accumulation of ice therein without becoming plugged or substantially reducing the flow of gases therethrough. After a short time, probably about 15 to 30 minutes, the temperature of the incoming air will be reduced in the reversing heat exchanger to a sufficiently low temperature to have substantially all the water vapor removed therefrom and at this time valve 84 can be closed to interrupt the flow of expanded air through conduit 83, and valve 98 can be opened to thus direct the flow of air from the expansion engine through conduit 97 and into conduit 94. The air stream now flows from conduit 94 into the outer course 96 in the liquefier 67 wherein it is in heat exchange relation with the air which is trapped in liquefier course 66 by reason of valve 69 being closed. The air stream flowing through liquefier course 96 continues out through conduit 51 and into the reversing heat exchanger where it is as before in heat exchange relation with the incoming air. The temperature of the incoming air is thus continuously reduced until substantially all of the carbon dioxide is deposited out. After a period of about two hours, at which time the air in liquefier course 66 has become mostly liquefied, valve 69 can be partially opened to allow liquid air to flow into the rectification column. Valve 69 is maintained in a partially open position to keep the pressure in the rectification column relatively low, i.e. approximately 16–24 p.s.i.g. while liquid air is built up in the boiler. When a predetermined amount of liquid air is built up in the boiler, the oxygen product valve 46, which has heretofore been closed, is opened slightly. Then as the liquid level in the boiler-condenser reaches a predetermined operating level valve 98 is closed to thus place the plant in normal operation and direct all of the cold expanded air from the expansion engine through conduit 75 and the liquefier course 76 and thence through the conduit 80 along with liquid air flowing through the conduit 68 into the high pressure stage of the rectification column. When the oxygen product reaches a predetermined degree of purity, say on the order of 99.5%, oxygen supply valve 46 is opened wider and the plant is ready to produce oxygen at full capacity.

Referring now to the improved warm-up means hereinabove mentioned for the system illustrated in Fig. 1, it will be understood by those skilled in the art that there may be instances when a sufficient amount of impurities would be carried into and deposited in the relatively small liquefier courses 66 and 76 to plug them, and the resulting pressure drop thereacross may be great enough to render the plant inoperative. During the warm-up period it is necessary to raise the temperature within the liquefier, and thus it is not desirable to direct the air through the expansion engine before it enters the liquefier. By closing valve 57 in conduit 56 and opening valve 72 in the bypass conduit 60, the air will flow around the expansion engine through the bypass conduit. Valve 98 is also open during the warm-up period and valve 84 is closed, with the result that the air stream flowing through bypass conduit 60 will continue through the conduit 97 and into the conduit 94 normally occupied by the nitrogen effluent and thence through the outer course 96 in the liquefier 67 to the reversing heat exchanger via conduit 51. As the air being recirculated through the reversing heat exchanger has not been cooled in the expansion engine and there is no longer any material refrigeration from the products of rectification, the temperature of the air flowing into the outer course 96 of the liquefier will gradually rise to that temperature necessary to re-evaporate any impurities which have become deposited in the liquefier courses 66 and 76. After a predetermined time wherein all of the deposited impurities have been removed from the walls of the liquefier courses, valve 105 is opened for a brief period, to thereby allow air to flow through both courses 66 and 76 and thus carry the impurities out through conduit 104 to the atmosphere.

After the liquefier has been purged, valves 105 and 69 are closed. Likewise valve 72 is closed and valve 84 is maintained in a closed position, while valve 98 remains open to direct the cold air stream flowing from the expansion engine through the outer passage 96 in the liquefier and thence out to the atmosphere through conduit 51 and through the reversing heat exchanger courses. The plant is then cooled down in a manner similar to that discussed above in connection with starting the plant, except in many instances the warm up period will not consume a long enough period of time to effect the loss of any great amount of the liquid air which is built up in the boiler-condenser, with the result that the cool down period will be shortened by the amount of time which is normally necessary to build up the predetermined amount of liquid air in the boiler-condenser.

In those instances when it is desired to thaw out the system in a much shorter time, a scheme such as that shown in Fig. 2 can be used. The oxygen generating system disclosed in Fig. 2 is identical to that disclosed in Fig. 1, save for the inclusion of an external heating means for warming the air stream during the warm-up period of operation, subsequent to its passage through the expansion engine bypass. In so far as the system of Fig. 2 is the same as Fig. 1, like reference numerals will be used to identify the parts. Looking now at Fig. 2, a conduit 110 having a suitable stop valve 111 connects at one end with conduit 70 and at its other end with a course 112 in a heater 113 (heat exchanger). Heater 113 is shown in diagrammatic form, as it will be understood that any conventional heater could be used for the intended purpose. The heater 113 may have a fluid at an appropriate temperature supplied to the space surrounding the course 112, from any suitable source, within the overall system described or any other source. A further conduit 114 having a stop valve 115 therein connects the free end of heater course 112 with conduit 94. During the warm-up period of the system disclosed in Fig. 2, valves 57 and 98 are closed and valve 72 is opened with the result that the air stream bypasses the expansion engine 55 and flows through conduit 60. Valves 111 and 115 are also open while valve 84 is closed, with the air flowing through conduits 60 and 70 thus being directed through branch conduit 110, heater course 112 and conduit 114 into the conduit 94. The warmed air flowing from conduit 94 follows the same path as in the warm-up scheme of the system of Fig. 1, namely through the outer course 96 in the liquefier and conduit 51 to the reversing heat exchanger where it passes in heat exchange with the entering air stream and out to the atmosphere. After the impurities are freed from the walls of courses 66 and 76 in the liquefier, the latter can be purged by again opening valve 105. The impurities are thus carried out to the atmosphere through conduit 104. It can be seen that the effect of the warm-up in Fig. 2 is the same as that described in connection with the system of Fig. 1, however with the addition of an external heat source, such as the heater 113, the system can be thawed out, so to speak, in a much shorter time.

While there are in this application specifically described two forms which the invention may assume in practice, it will be understood that these forms of the same are shown for purposes of illustration and that the invention may be modified and embodied in various other forms without departing from its spirit or the scope of the appended claims.

What we claim is:

1. In a method of rectifying a gaseous mixture wherein during normal operation an entering mixture of said gases is passed through a heat exchange zone in counterflowing heat exchange with at least one product of rectification at a lower temperature, to lower the temperature of said mixture and purify the same by removing substantially all of at least one component of higher boiling point, and at least the major portion of the purified mixture is directed through an expansion device, through a first passage in a second heat exchange zone in heat exchange relation with said at least one product of rectification prior to the latter's passage in heat exchange relation with said entering mixture of said gases, and then to the rectification unit; the steps of arresting the flow of said major portion of the purified gaseous mixture through said expansion device and its subsequently followed above mentioned path to render the separation unit inoperative, and directing at least said major portion of the purified mixture successively through the path in said second heat exchange zone previously occupied by said at least one product of rectification in heat exchange with the passage in said second heat exchange zone just previously occupied by said major portion of the purified gaseous mixture and then in heat exchange relation with said entering gaseous mixture.

2. A method of rectifying a gaseous mixture as set forth in claim 1 and in addition thereto the step of subsequently directing at least a part of said major portion of the purified mixture through said first passage in said second heat exchange zone and then to the atmosphere.

3. In a method of rectifying a gaseous mixture wherein during normal operation an entering mixture of said gases is passed through a heat exchange zone in counterflowing heat exchange with at least one product of rectification at a lower temperature, to lower the temperature of said mixture and purify the same by removing a component of higher boiling point, and a major portion of the purified mixture is directed through an expansion device, a passage in a second heat exchange zone in heat exchange relation with said at least one product of rectification and then to the rectification unit, and a minor portion of the purified mixture is passed through a second passage in said second heat exchange zone in heat exchange relation with said last mentioned product of rectification and then into said rectification unit, the steps of arresting the flow of said purified gaseous mixture streams to the separation unit, directing said major portion of the purified mixture in bypassing relation to said expansion device and through said path previously occupied by said at least one product of rectification successively in heat exchange with said second heat exchange zone passages and then in heat exchange relation with said entering gaseous mixture.

4. In a method of rectifying a gaseous mixture wherein during normal operation an entering mixture of said gases is passed through a heat exchange zone in counterflowing heat exchange with at least one product of rectification at a lower temperature, to lower the temperature of said mixture and purify the same by removing a component of higher boiling point, and a major portion of the purified mixture is directed through an expansion device, a first passage in a second heat exchange zone in heat exchange relation with said at least one product of rectification and then to the rectification unit, and a minor portion of the purified mixture is passed through a second passage in said second heat exchange zone in heat exchange relation with said last mentioned product of rectification and then into said rectification unit, the steps of arresting the flow of said purified gaseous mixture streams to the separation unit, directing at least the major portion of the purified mixture in bypassing relation to said expansion device and through said path previously occupied by said at least one product of rectification successively in heat exchange with said second heat exchange zone passages, then in heat exchange relation with said entering gaseous mixture, and subsequently directing at least a part of said major and minor streams of the purified mixture through said first and second passages in said second heat exchange zone and to the atmosphere.

5. In a method of rectifying a gaseous mixture wherein during normal operating conditions an entering air stream of said gases is passed through a heat exchange zone in counterflowing heat exchange with at least one product of rectification at a lower temperature, to lower the temperature of said mixture and purify the same by removing a component of higher boiling point, and at least a major portion of the purified mixture is directed through an expansion device, through a second heat exchange zone in heat exchange relation with said at least one product of rectification prior to the latter's passage in heat exchange relation with said entering mixture of said gases, and then to the rectification unit; the steps of arresting the flow of said at least a major portion of the purified gaseous mixture to the separation unit, subsequently subjecting a stream comprising at least the major portion of the purified mixture to a heat source to raise its temperature, and directing said last mentioned stream through the portion of said path previously occupied by said at least one product of rectification successively in heat exchange with the portion of said second heat exchange zone previously occupied by said major portion of the purified mixture and then in heat exchange relation with said entering gaseous mixture.

6. In a method of rectifying a gaseous mixture wherein during normal operating conditions an entering air stream of said gases is passed through a heat exchange zone in counterflowing heat exchange with at least one product of rectification at a lower temperature, to lower the temperature of said mixture and purify the same by removing a component of higher boiling point, and at least a major portion of the purified mixture is directed through an expansion device, through a second heat exchange zone in heat exchange relation with said at least one product of rectification prior to the latter's passage in heat exchange relation with said entering mixture of said gases, and then to the rectification unit; the steps of arresting the flow of said major portion of the purified gaseous mixture to said rectification unit, directing a stream comprising at least most of the purified mixture through a path in bypassing relation to said expansion device, subjecting said last stream to a heat source to raise its temperature, and directing said last mentioned stream through the portion of said path previously occupied by said at least one product of rectification successively in heat exchange with the portion of said second heat exchange zone previously occupied by said major portion of the purified mixture and then in heat exchange relation with said entering gaseous mixture.

7. In an apparatus for separating a mixture of gases to produce one component thereof as a nearly pure product, in combination, a reversing heat exchanger having at least two courses in heat exchange relation, means for periodically interchanging the flow of an entering mixture of said gases and a leaving product of separation, at a lower temperature than said mixture, through said courses, an expansion device, conduit means for connecting said courses to said expansion device, a non-reversing heat exchanger having a plurality of courses in heat exchange relation, conduit means traversed by the cold expanded mixture of gases connecting said expansion device with one of said non-reversing heat exchanger courses, a rectification column, conduit means for connecting said last mentioned course in said non-reversing heat exchanger with said rectification column, conduit means traversed by said leaving product of separation connecting said rectification column with a second course in said non-reversing heat exchanger, conduit means for connecting said non-reversing heat exchanger second course with said reversing heat exchanger courses, further conduit means connected at one end with said conduit means extending between said reversing heat exchanger and said expansion device and at its other end connected to said second mentioned conduit means of those extending between said rectification column and said non-reversing heat exchanger and means for selectively directing said mixture of gases to said expansion device and through said further conduit means.

8. In an apparatus for separating a mixture of gases to produce one component thereof as a nearly pure product, in combination, a reversing heat exchanger having at least two courses in heat exchange relation, means for periodically interchanging the flow of an entering mixture of said gases and a leaving product of separation, at a lower temperature than said mixture, through said courses, an expansion device, conduit means for connecting said courses to said expansion device, a non-reversing heat exchanger having a plurality of courses in heat exchange relation, conduit means traversed by said cold expanded mixture of gases connecting said expansion device with one of said non-reversing heat exchanger courses, a rectification column, conduit means for connecting said last mentioned course in said non-reversing heat exchanger with said rectification column, conduit means traversed by said leaving product of separation connecting said rectification column with a second course in said non-reversing heat exchanger, conduit means for connecting said non-reversing heat exchanger second course with said reversing heat exchanger courses, further conduit means connected at one end with said conduit means extending between said reversing heat exchanger and said expansion device and at its other end connected to said second mentioned conduit means of those extending between said rectification column and said non-reversing heat exchanger and means for selectively interrupting the flow of said mixture of gases through said conduit extending between said reversing heat exchanger courses and said expansion device and through said further conduit means said last mentioned means including valve means positioned in each of said last mentioned conduits.

9. An apparatus for separating a mixture of gases as set forth in claim 7 having a heating means associated with said further conduit means.

References Cited in the file of this patent

UNITED STATES PATENTS

| | | |
|---|---|---|
| 1,951,183 | De Baufre | Mar. 13, 1934 |
| 2,239,883 | De Baufre | Apr. 29, 1941 |
| 2,460,859 | Trumpler | Feb. 8, 1949 |
| 2,503,939 | De Baufre | Apr. 11, 1950 |
| 2,541,409 | Cornelius | Feb. 13, 1951 |
| 2,617,275 | Goff | Nov. 11, 1952 |
| 2,663,168 | Schilling | Dec. 22, 1953 |
| 2,671,324 | Trumpler | Mar. 9, 1954 |
| 2,680,357 | Collins | June 8, 1954 |